US012451573B2

(12) United States Patent
Kan

(10) Patent No.: US 12,451,573 B2
(45) Date of Patent: Oct. 21, 2025

(54) DIELECTRIC FILTER

(71) Applicant: Murata Manufacturing Co., Ltd., Kyoto-fu (JP)

(72) Inventor: Tatsunori Kan, Nagaokakyo (JP)

(73) Assignee: MURATA MANUFACTURING CO., LTD., Kyoto-Fu (JP)

( * ) Notice: Subject to any disclaimer, the term of this patent is extended or adjusted under 35 U.S.C. 154(b) by 150 days.

(21) Appl. No.: 18/492,969

(22) Filed: Oct. 24, 2023

(65) Prior Publication Data

US 2024/0072403 A1 Feb. 29, 2024

Related U.S. Application Data

(63) Continuation of application No. PCT/JP2022/013129, filed on Mar. 22, 2022.

(30) Foreign Application Priority Data

Apr. 26, 2021 (JP) ................................ 2021-074258

(51) Int. Cl.
*H01P 1/205* (2006.01)
*H01P 1/203* (2006.01)

(52) U.S. Cl.
CPC .......... *H01P 1/20345* (2013.01); *H01P 1/205* (2013.01)

(58) Field of Classification Search
CPC ............................ H01P 1/205; H01P 1/20345
USPC .................................. 333/12, 175, 182, 185
See application file for complete search history.

(56) References Cited

U.S. PATENT DOCUMENTS 4,821,007 A 4/1989 Fields et al.
2012/0169180 A1 7/2012 Saruban et al.
2016/0365616 A1* 12/2016 Baldwin ............ H01P 1/20336

FOREIGN PATENT DOCUMENTS

JP H04-043703 A 2/1992
JP H08-288706 A 11/1996
JP 2007-158440 A 6/2007
JP 2007-235465 A 9/2007
JP 2012-142478 A 7/2012
JP 2014-127581 A 7/2014

OTHER PUBLICATIONS

International Search Report for PCT/JP2022/013129 dated Jun. 14, 2022.

* cited by examiner

*Primary Examiner* — Jorge L Salazar, Jr.
(74) *Attorney, Agent, or Firm* — McDonald Hopkins LLC

(57) ABSTRACT

A filter device includes a stack body, plate electrodes, resonators, and shield conductors. The plate electrodes are disposed inside the stack body apart from each other in the stacking direction. The resonators are disposed between the plate electrodes and extend in the Y-axis direction. The shield conductors are disposed on the side surfaces of the stack body, respectively. The shield conductors are connected to the plate electrodes. The resonators are disposed inside the stack body side by side in the X-axis direction. A first end of each of the resonators is connected to the shield conductor, and a second end thereof is separated from the shield conductor. The first end of each of the resonators is formed with a cutout.

18 Claims, 9 Drawing Sheets

FIG. 7
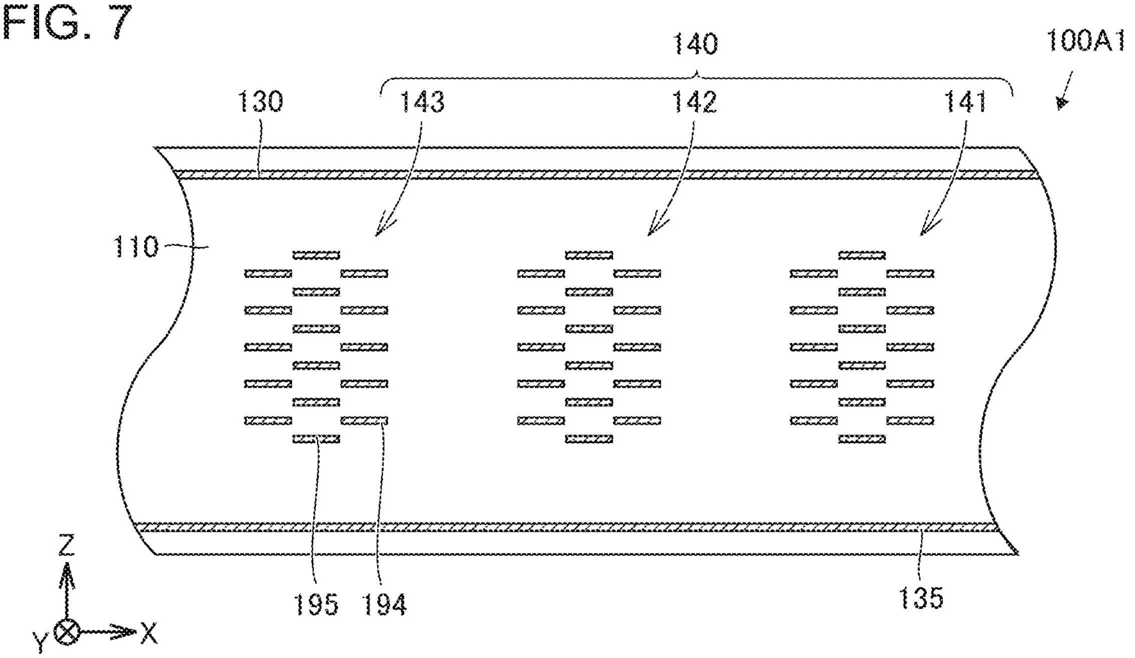
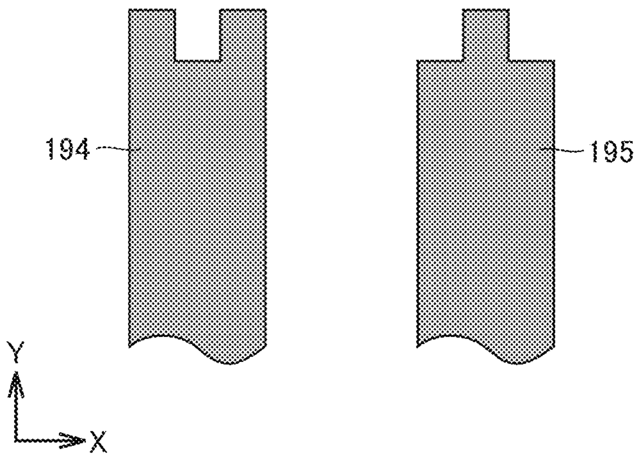
FIG. 8A FIG. 8B

FIG. 9
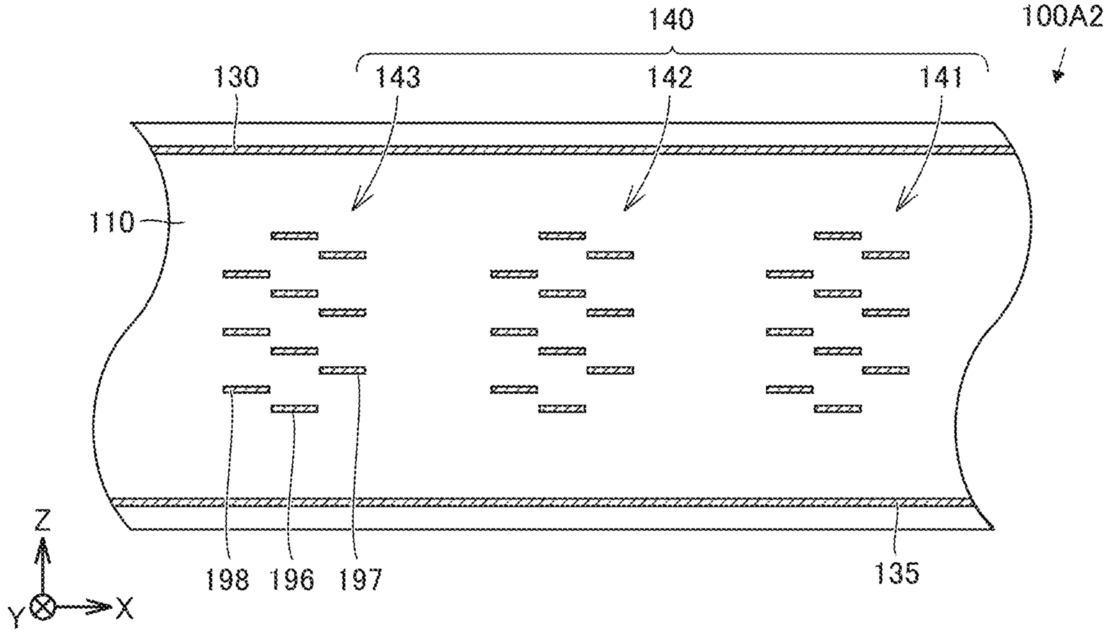
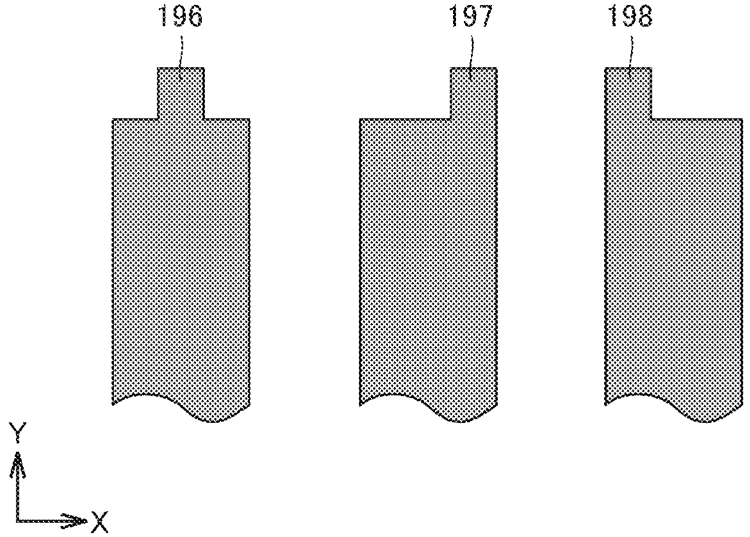
FIG. 10A FIG. 10B FIG. 10C

DIELECTRIC FILTER

CROSS REFERENCE TO RELATED APPLICATION

This is a continuation of International Application No. PCT/JP2022/013129 filed on Mar. 22, 2022 which claims priority from Japanese Patent Application No. 2021-074258 filed on Apr. 26, 2021. The contents of these applications are incorporated herein by reference in their entireties.

BACKGROUND OF THE DISCLOSURE

Field of the Disclosure

The present disclosure relates to a dielectric filter, and more specifically, relates to a technology for preventing the structural defects during the manufacture of a dielectric filter.

Description of the Related Art

Japanese Patent Application Laid-Open No. 2007-235465 (PTL 1) discloses a band-pass filter which employs a multilayer dielectric resonator in which a plurality of internal electrode layers are stacked in a dielectric body. In the band-pass filter disclosed in Japanese Patent Application Laid-Open No. 2007-235465 (PTL 1), the inductor of the internal electrode layer is formed into a longitudinal shape, and the width of a part of the longitudinal inductor gradually narrows. With such a configuration, it is possible to reduce the resonance frequency without lowering the Q value, which makes it possible to reduce the size of the resonator.

PTL 1: Japanese Patent Laid-Open No. 2007-235465
PTL 2: Japanese Patent Laid-Open No. 2014-127581

BRIEF SUMMARY OF THE DISCLOSURE

The dielectric filter disclosed in Japanese Patent Application Laid-Open No. 2007-235465 (PTL 1) is used in a small mobile terminal such as a mobile phone or a smartphone for filtering radio-frequency signals.

The dielectric filter is generally manufactured by stacking a plurality of dielectric layers on which plate conductors are arranged, and then pressing or sintering the stacked layers. In the manufacturing process of a dielectric filter, if there is a portion where the conductor density in the stacking direction is partially large, a difference in thermal expansion coefficient between a portion where the conductor density is large and a portion where the conductor density is small may cause a structural defect such as a crack to occur between the conductor and the dielectric layers, which may damage the dielectric filter or degrade the performance of the dielectric filter.

The present disclosure has been made to solve such a problem, and a possible benefit thereof is to prevent the structural defects during the manufacture of a dielectric filter.

A dielectric filter of the present disclosure includes a stack body which includes a plurality of dielectric layers and has a cuboid shape, a first plate electrode and a second plate electrode, a plurality of resonators, and a first shield conductor and a second shield conductor. The first plate electrode and the second plate electrode are disposed in the stack body apart from each other in the stacking direction. The plurality of resonators are disposed between the first plate electrode and the second plate electrode and configured to extend in a first direction orthogonal to the stacking direction. The first shield conductor and the second shield conductor are disposed on the first side surface and the second side surface of the stack body, respectively, and both the first side surface and the second side surface are perpendicular to the first direction. The first shield conductor and the second shield conductor are connected to the first plate electrode and the second plate electrode. The plurality of resonators are disposed inside the stack body side by side in a second direction orthogonal to both the stacking direction and the first direction. A first end of each of the plurality of resonators is connected to the first shield conductor, and a second end is separated from the second shield conductor. The first end of each of the plurality of resonators is formed with a first cutout.

According to the dielectric filter of the present disclosure, in a connection portion between the resonator and the shield conductor, a cutout is formed at an end of the resonator. Since the cutout reduces the conductor density of the connection portion in the stacking direction, the structural defects in the connection portion is prevented during the manufacture of the dielectric filter. In addition, since the current density tends to be relatively large in the connection portion between the resonator and the shield conductor, it is possible to reduce the influence on the performance of the dielectric filter by preventing the structural defects.

BRIEF DESCRIPTION OF THE SEVERAL VIEWS OF THE DRAWINGS

FIG. 7 is a cross-sectional view of a filter device according to a second modification;

Figure 11:
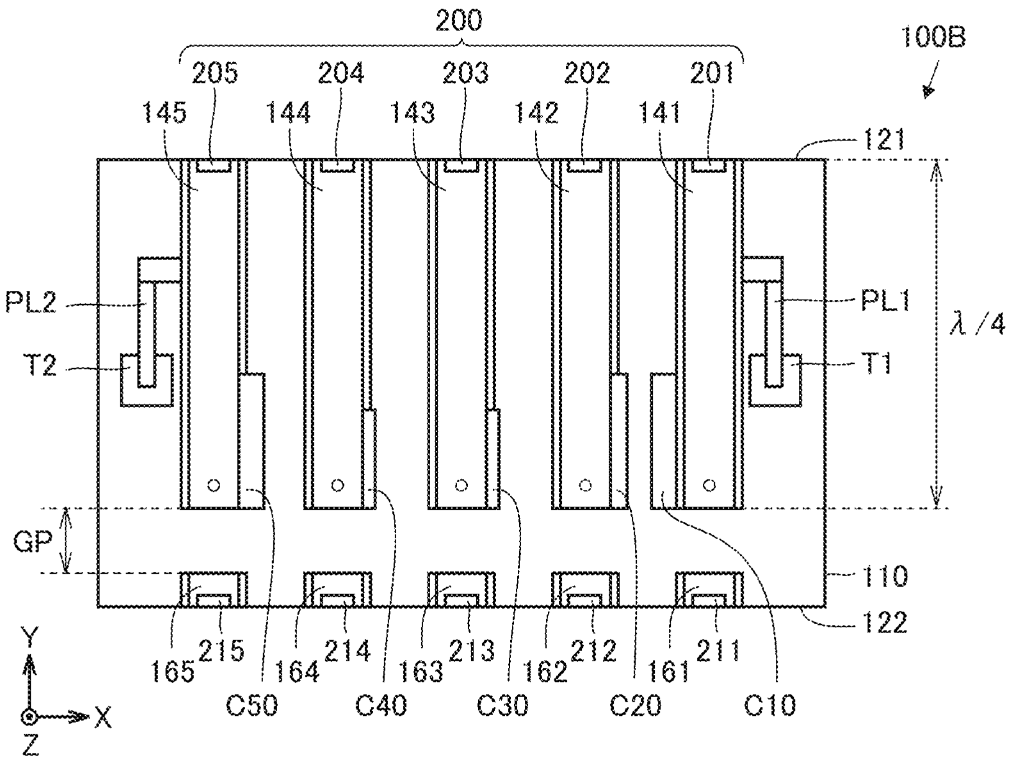
Figure 12:
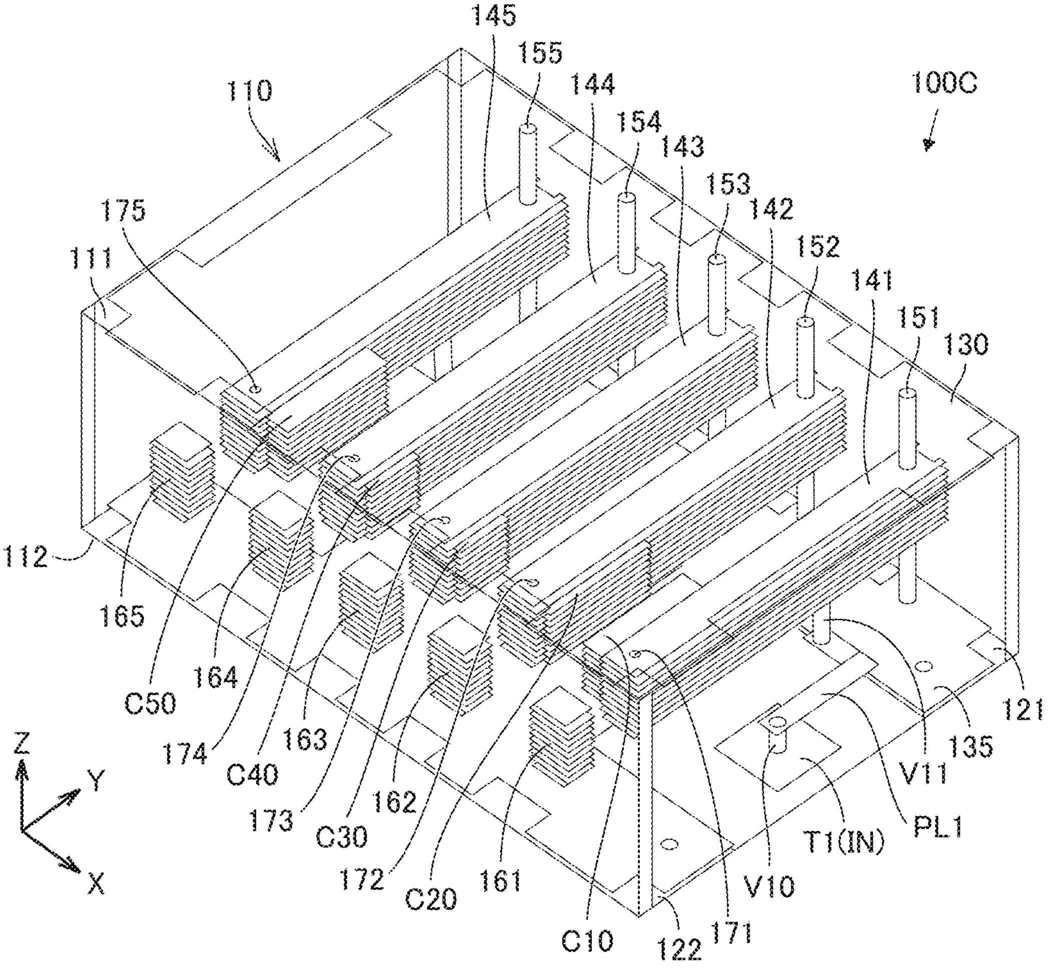
Figure 13:
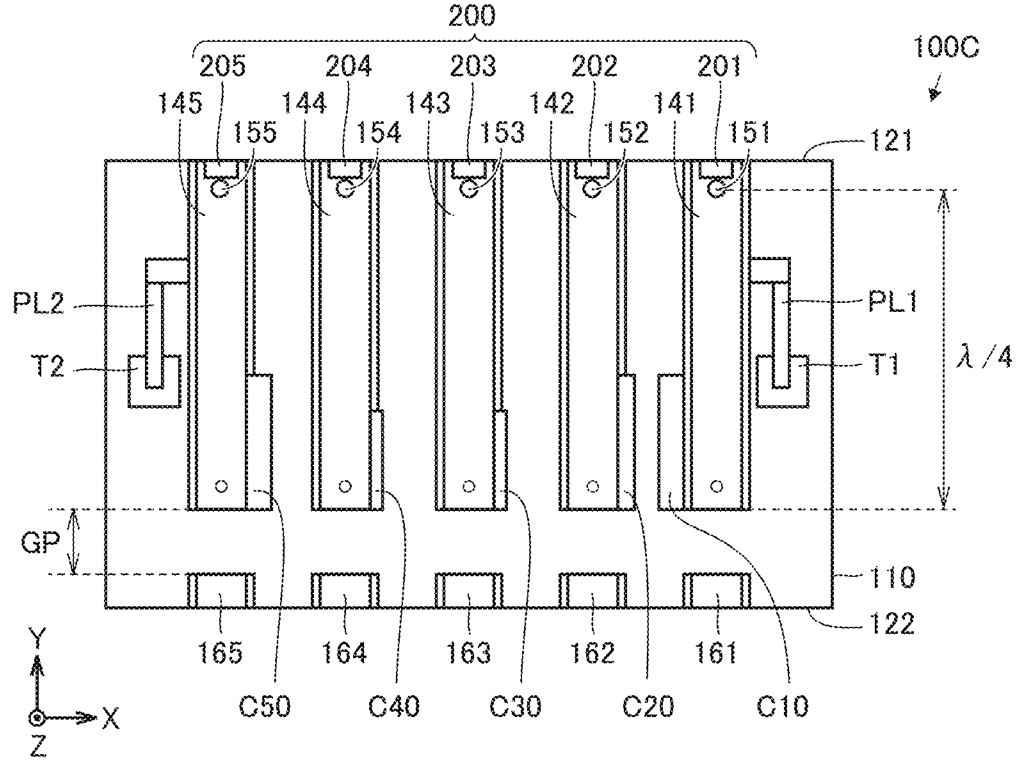

Each of FIGS. 8A and 8B is a diagram illustrating an example shape of a conductor formed with a cutout according to the second modification;

FIG. 9 is a cross-sectional view of a filter device according to a third modification;

Each of FIGS. 10A, 10B and 10C is a diagram illustrating an example shape of a conductor formed with a cutout according to the third modification;

FIG. 11 is a plan view of a filter device according to a fourth modification;

FIG. 12 is a transparent perspective view illustrating an internal configuration of a filter device according to a second embodiment; and FIG. 13 is a plan view of a filter device according to the second embodiment.

DETAILED DESCRIPTION OF THE DISCLOSURE

Hereinafter, embodiments of the present disclosure will be described in detail with reference to the drawings. It should be noted that in the drawings, the same or equivalent portions will be denoted by the same reference numerals, and the description thereof will not be repeated.

First Embodiment (Basic Configuration of Communication Apparatus)

Figure 1:
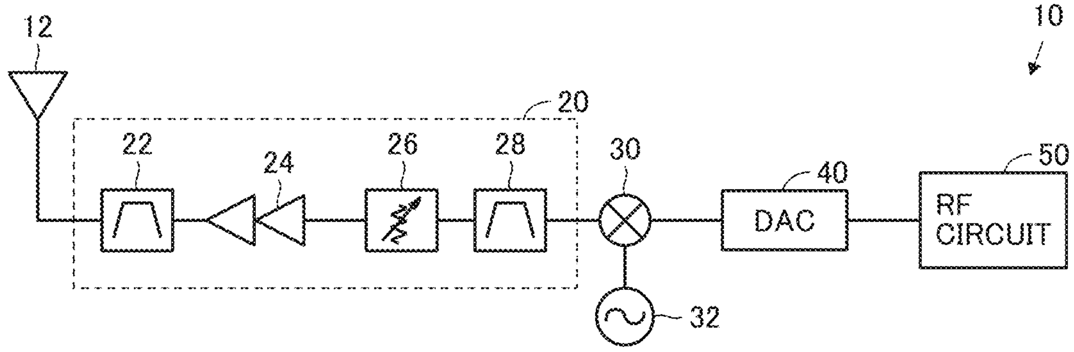
FIG. 1 is a block diagram of a communication apparatus having a radio-frequency front-end circuit to which a filter device according to a first embodiment is applied.

FIG. 1 is a block diagram of a communication apparatus 10 having a radio-frequency front-end circuit 20 to which a filter device according to a first embodiment is applied. The communication apparatus 10 is, for example, a mobile terminal such as a smartphone, or a mobile base station.

With reference to FIG. 1, the communication apparatus 10 includes an antenna 12, a radio-frequency front-end circuit 20, a mixer 30, a local oscillator 32, a D/A converter (DAC) 40, and an RF circuit 50. The radio-frequency front-end circuit 20 includes a band-pass filter 22, a band-pass filter 28, an amplifier 24, and an attenuator 26. Although FIG. 1 illustrates a case where the radio-frequency front-end circuit 20 includes a transmission circuit that transmits a radio-frequency signal from the antenna 12, the radio-frequency front-end circuit 20 may include a reception circuit that receives a radio-frequency signal via the antenna 12.

The communication apparatus 10 up-converts a signal transmitted from the RF circuit 50 to a radio-frequency signal and transmits the radio-frequency signal from the antenna 12. The D/A converter 40 converts the modulated digital signal output from the RF circuit 50 into an analog signal. The mixer 30 mixes the analog signal converted by the D/A converter 40 with an oscillation signal from the local oscillator 32, and up-converts the mixed signal into a radio-frequency signal. The band-pass filter 28 filters out unwanted waves generated in the up-conversion process and extracts only the signal within a desired frequency band. The attenuator 26 adjusts the intensity of the signal. The amplifier 24 amplifies the signal that has passed through the attenuator 26 to a predetermined level. The band-pass filter 22 filters out unwanted waves generated in the amplification process and allows only the signal within a frequency band determined by the communication standard to pass through. The signal that has passed through the band-pass filter 22 is transmitted from the antenna 12 as a transmission signal.

The filter device according to the present disclosure may be adopted as the band-pass filters 22 and 28 in the communication apparatus 10 described above.

(Configuration of Filter Device)

Next, a detailed configuration of the filter device 100 according to the first embodiment will be described with reference to FIGS. 2 to 5. The filter device 100 is a dielectric filter that includes a plurality of resonators, each of which is distributed constant element.

Figure 2:
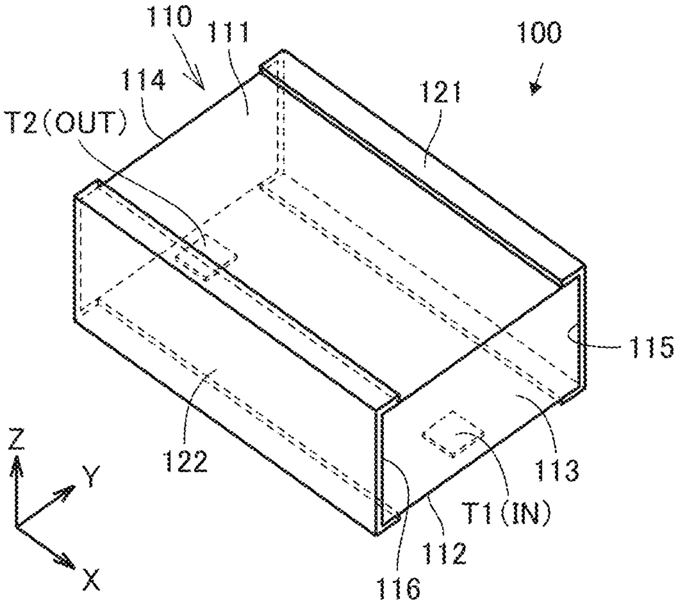
FIG. 2 is an external perspective view of the filter device according to the first embodiment.
Figure 3:
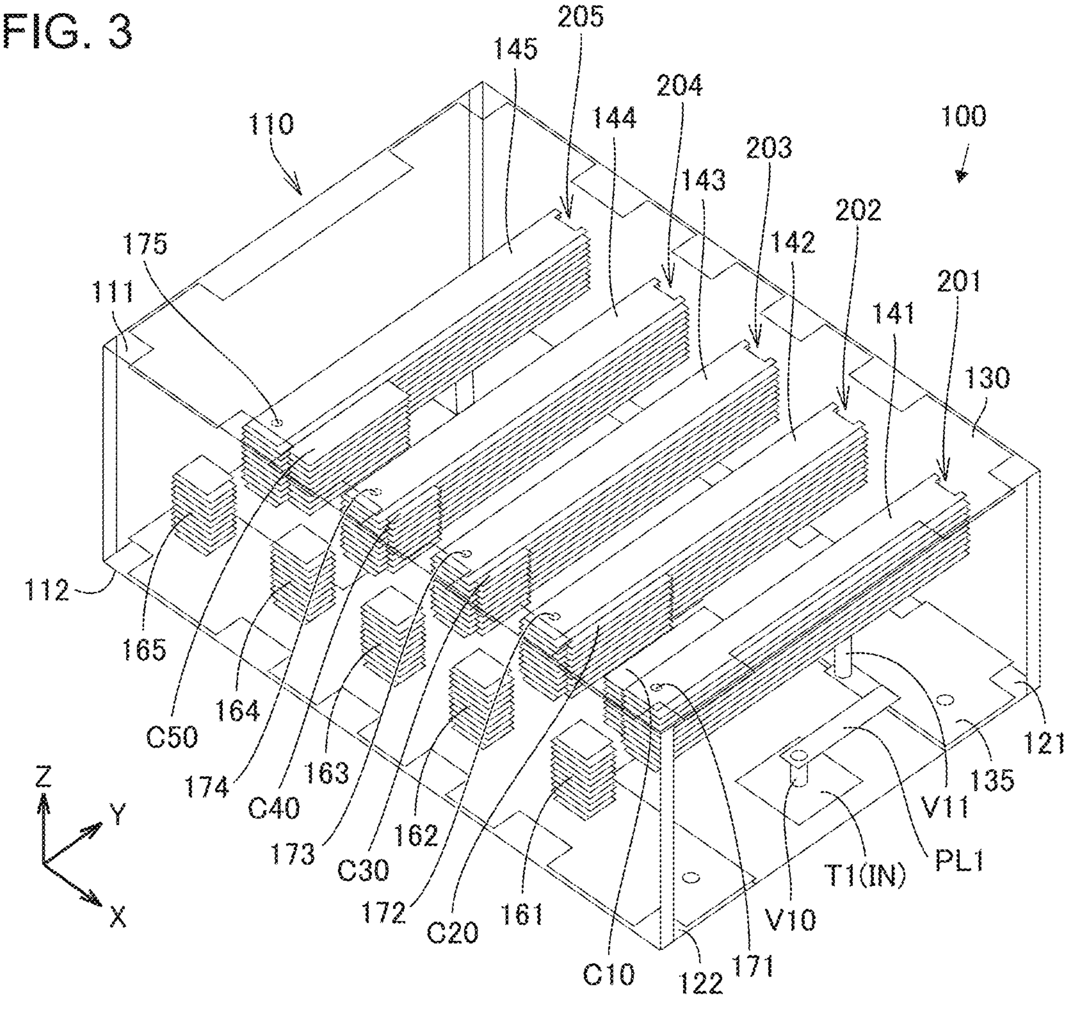
FIG. 3 is a transparent perspective view illustrating an internal configuration of the filter device according to the first embodiment.
Figure 4:
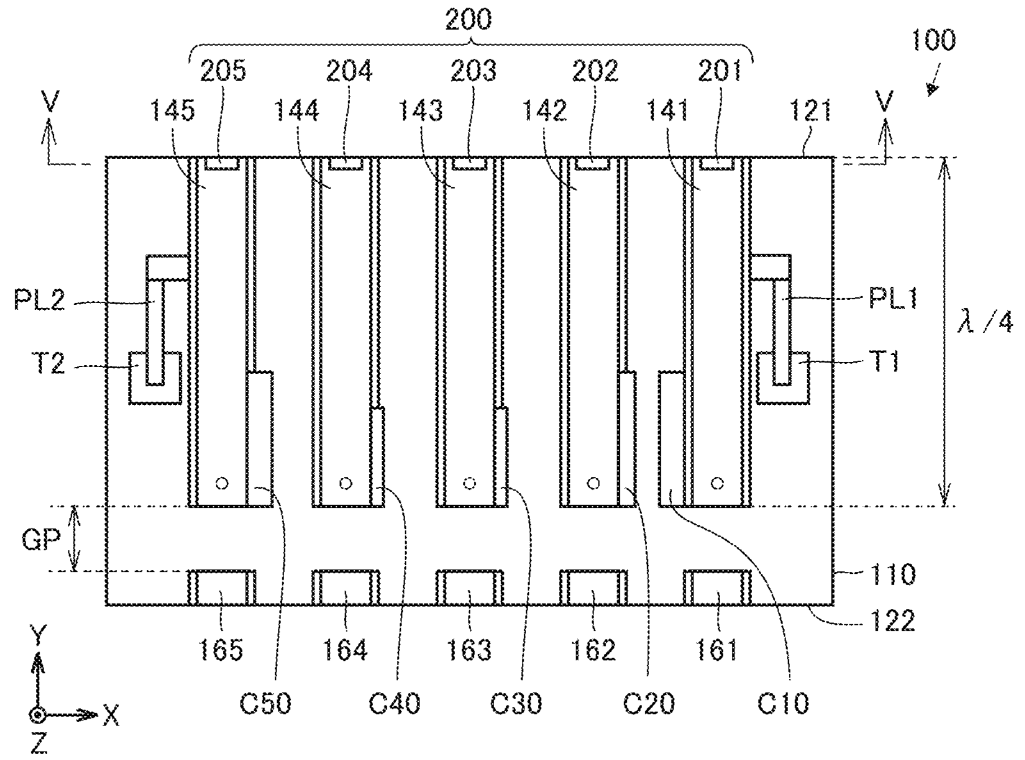
FIG. 4 is a plan view of the filter device according to the first embodiment.
Figure 5:
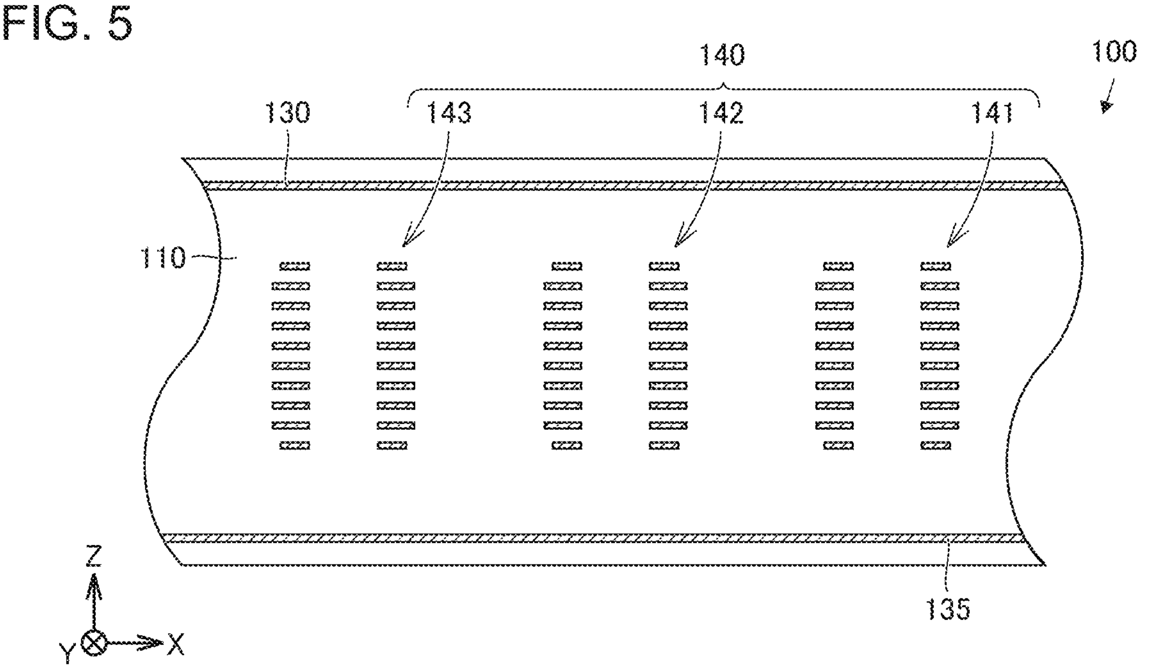
FIG. 5 is a cross-sectional view of the filter device according to the first embodiment.

FIG. 2 is an external perspective view of the filter device 100. FIG. 2 only illustrates the outer configuration of the filter device 100 which is visible from the outer surface, and does not illustrate the internal configuration thereof. FIG. 3 is a transparent perspective view illustrating the internal configuration of the filter device 100. FIG. 4 is a plan view of the filter device 100 viewed from the stacking direction. FIG. 5 is a cross-sectional view taken along a line V-V of FIG. 4.

With reference to FIG. 2, the filter device 100 includes a cuboid or substantially cuboid stack body 110 which includes a plurality of dielectric layers stacked in the stacking direction. The stack body 110 includes an upper surface 111, a lower surface 112, a side surface 113, a side surface 114, a side surface 115, and a side surface 116. The side surface 113 is a side surface in the positive direction of the X-axis, and the side surface 114 is a side surface in the negative direction of the X-axis. The side surfaces 115 and 116 are side surfaces perpendicular to the Y-axis direction.

Each dielectric layer of the stack body 110 is made of, for example, ceramics, such as low temperature co-fired ceramics (LTCC), or resin. Inside the stack body 110, a plurality of planar conductors formed in each dielectric layer and a plurality of vias formed between the dielectric layers constitute distributed constant elements that constitute a resonator, and a capacitor and an inductor for coupling the distributed constant elements. In the present specification, the term "via" denotes a conductor that is configured to extend in the stacking direction so as to connect conductors provided in different dielectric layers. The via is formed, for example, by conductive paste, plating, and/or a metal pin.

In the following description, the stacking direction of the stack body 110 is set as "Z-axis direction", the direction orthogonal to the Z-axis direction and along the long side of the stack body 110 is set as "X-axis direction" (second direction), and the direction orthogonal to the Z-axis direction and along the short side of the stack body 110 is set as "Y-axis direction" (first direction). In addition, in the following description, the positive direction of the Z-axis in each drawing may be referred to as an upper side and the negative direction thereof may be referred to as a lower side.

As illustrated in FIG. 2, the filter device 100 includes a shield conductor 121 that covers the side surface 115 of the stack body 110, and a shield conductor 122 that covers the side surface 116 thereof. The shield conductors 121 and 122 each have a substantially C-shape when viewed from the X-axis direction of the stack body 110. In other words, each of the shield conductor 121 and the shield conductor 122 covers a part of the upper surface 111 and a part of the lower surface 112 of the stack body 110. A part of the shield conductor 121 or a part of the shield conductor 122 that covers the lower surface 112 of the stack body 110 is connected to a ground electrode on a mounting substrate (not shown) via a connection conductor such as a solder bump. In other words, each of the shield conductors 121 and 122 also functions as a ground terminal.

The filter device 100 includes an input terminal T1 and an output terminal T2, which are disposed on the lower surface 112 of the stack body 110. The input terminal T1 is disposed on the lower surface 112 at a position close to the side surface 113 in the positive direction of the X-axis. On the other hand, the output terminal T2 is disposed on the lower surface 112 at a position close to the side surface 114 in the negative direction of the X-axis. Each of the input terminal T1 and the output terminal T2 is connected to a corresponding electrode on the mounting substrate via a connection conductors such as a solder bump.

Next, the internal configuration of the filter device 100 will be described with reference to FIG. 3. In addition to the components illustrated in FIG. 2, the filter device 100 further includes plate electrodes 130 and 135, a plurality of resonators 141 to 145, capacitor electrodes 161 to 165, and connection conductors 171 to 175. In the following description, the resonators 141 to 145, the capacitor electrodes 161 to 165, and the connection conductors 171 to 175 may be collectively referred to as the "resonator 140", the "capacitor electrode 160", and the "connection conductor 170", respectively.

The plate electrodes 130 and 135 are arranged to face each other inside the stack body 110 at positions spaced apart from each other in the stacking direction (Z-axis direction). The plate electrode 130 is provided on a dielectric layer close to the upper surface 111, and is connected to the shield conductors 121 and 122 at an end in the X-axis direction. The plate electrode 130 is configured to substantially cover the dielectric layer when viewed from the stacking direction.

The plate electrode 135 is provided on a dielectric layer close to the lower surface 112 of the stack body 110. The plate electrode 135 is formed with a cutout at a position corresponding to the input terminal T1 and a cutout at a position corresponding to the output terminal T2, and thereby has a substantially H-shape when viewed in a plan view from the stacking direction. The plate electrode 135 is connected to the shield conductors 121 and 122 at an end in the X-axis direction.

The resonators 141 to 145 are disposed between the plate electrode 130 and the plate electrode 135 in the stack body 110. In the filter device 100, the resonators 141 to 145 are arranged side by side in the X-axis direction (second direction) inside the stack body 110. More specifically, the resonators 141, 142, 143, 144, and 145 are arranged in this order from the positive direction to the negative direction of the X-axis.

Each of the resonators 141 to 145 extends in the Y-axis direction (first direction). The end (first end) of each of the resonators 141 to 145 in the positive direction of the Y-axis is connected to the shield conductor 121. On the other hand, the end (second end) of each of the resonators 141 to 145 in the negative direction of the Y-axis is separated from the shield conductor 122.

Each of the resonators 141 to 145 is constituted by a plurality of conductors arranged along the stacking direction. The number of conductors constituting each resonator is, for example, 13 or more. In the resonator 140, the plurality of conductors constituting each resonator are electrically connected to each other by the connection conductor 170 at a position close to the second ends on the shield conductor 122 side. In each resonator, when the wavelength of the transmitted radio-frequency signal is λ, the length of each resonator in the Y-axis direction is designed to be about λ/4 (FIG. 4). The resonator 140 functions as a distributed constant TEM mode resonator which uses the plurality of conductors as the central conductor and uses the plate electrodes 130 and 135 as the outer conductor.

As illustrated in FIGS. 3 and 4, a connection portion of each of the resonators 141 to 145 which is connected to the shield conductor 121 is formed with cutouts 201 to 205 (hereinafter, collectively referred to as the "cutout 200"). FIG. 5 is a cross-sectional view taken along a line V-V passing through the cutout 200 in FIG. 4. As illustrated in FIG. 5, in the dielectric filter of the first embodiment, in all the conductors of each resonator, a cutout is formed near a central portion of each conductor in the X-axis direction. For example, when the width of the conductor in the X-axis direction of the resonator is 300 μm, the width of the cutout 200 is set to 50 μm±30 μm.

The resonator 141 is connected to the input terminal T1 via a via V11, a plate electrode PL1 and a via V10. Although hidden and invisible in FIG. 3, the resonator 145 is connected to the output terminal T2 via a via and a plate electrode PL2. The resonators 141 to 145 are magnetically coupled to each other, and the radio-frequency signal input to the input terminal T1 is transmitted in the order of the resonators 141 to 145 and output from the output terminal T2. At this time, the filter device 100 functions as a band-pass filter depending on the degree of coupling between the resonators.

The second end of the resonator 140 is provided with capacitor electrodes C10 to C50 protruding toward an adjacent resonator. Each capacitor electrode is formed by a part of a plurality of conductors protruding from the resonator. The degree of capacitive coupling between the resonators may be adjusted by the length of the capacitor electrode in the Y-axis direction, the distance between adjacent resonators, and/or the number of conductors constituting the capacitor electrode.

As illustrated in FIG. 3, in the filter device 100, the capacitor electrode C10 is configured to protrude from the resonator 141 toward the resonator 142, and the capacitor electrode C20 is configured to protrude from the resonator 142 toward the resonator 141. Further, the capacitor electrode C30 is configured to protrude from the resonator 143 toward the resonator 142, and the capacitor electrode C40 is configured to protrude from the resonator 144 toward the resonator 143. Furthermore, the capacitor electrode C50 is configured to protrude from the resonator 145 toward the resonator 144.

The capacitor electrodes C10 to C50 are not essential components, and a part of or all of the capacitor electrodes may not be provided as long as a desired degree of coupling can be realized between the resonators. Further, in addition to the configuration illustrated in FIG. 3, the filter device may further include a capacitor electrode configured to protrude from the resonator 142 toward the resonator 143, a capacitor electrode configured to protrude from the resonator 143 toward the resonator 144, and a capacitor electrode configured to protrude from the resonator 144 toward the resonator 145.

In the filter device 100, the capacitor electrode 160 is arranged to face the second end of the resonator 140. The cross section of the capacitor electrode 160 parallel to the ZX plane is the same as the cross section of the resonator 140. The capacitor electrode 160 is connected to the shield conductor 122. Thus, each resonator 140 and a corresponding capacitor electrode 160 constitute a capacitor. The capacitance of the capacitor constituted by each resonator 140 and a corresponding capacitor electrode 160 can be adjusted by adjusting a gap (a distance in the Y-axis direction) GP (as illustrated in FIG. 4) formed between each resonator 140 and a corresponding capacitor electrode 160.

The dielectric filter described above is generally manufactured by stacking a plurality of dielectric layers on which plate conductors are arranged, and pressing or sintering the stacked layers. In the manufacturing process of the dielectric filter, if there is a portion where the conductor density in the stacking direction is partially large, a difference in thermal expansion coefficient between a portion where the conductor density is large and a portion where the conductor density is small may cause structural defects such as cracks between the conductor and the dielectric, peeling between the dielectric layers, and/or deterioration of the surface flatness of the stack body, which makes it impossible to realize the capacitance and inductance as intended by the design, and thereby degrade the performance of the dielectric filter.

Further, in the dielectric filter constituted by the distributed constant elements according to the first embodiment, the current density in the connection portion between each resonator and the shield conductor is relatively larger than in the other portions. If a structural defect occurs in such a portion, excessive heat generation or an increase in the resistance of the connection portion may damage the dielectric filter or degrade the performance of the dielectric filter.

In the filter device 100 according to the first embodiment, the cutout 200 is formed in the connection portion between the resonators 141 to 145 and the shield conductor 121 at a position near the center of the conductors constituting each resonator. The cutout 200 reduces the conductor density of the connection portion, which thereby prevents the structural defects in the manufacturing process of the filter device 100.

In general, when a radio-frequency current flows through a conductor, the radio-frequency current flows mainly through the surface of the conductor due to the edge effect. In the filter device 100, as described above, the cutout is formed in the central portion in the width direction of the plurality of conductors constituting the resonator, and the conductors of the resonator and the shield conductor 121 are connected at both edges of the conductors in the width direction where the radio-frequency current tends to concentrate. Therefore, even when a cutout is formed, the conduction resistance is maintained at the same level as that in the case where no cutout is formed, and thereby, an increase in conduction loss is suppressed. Accordingly, a decrease in the Q value is suppressed, and as a result, the degradation in the performance of the dielectric filter is prevented.

As described above, in the filter device 100 according to the first embodiment, by forming the cutout 200 in the connection portion between the resonator 140 and the shield conductor 121, it is possible to prevent the structural defects during the manufacturing process while suppressing the degradation in the performance of the dielectric filter.

Note that the "plate electrode 130" and the "plate electrode 135" in the first embodiment correspond to the "first plate electrode" and the "second plate electrode" in the present disclosure, respectively. The "shield conductor 121" and the "shield conductor 122" in the first embodiment correspond to the "first shield conductor" and the "second shield conductor" in the present disclosure, respectively. The "side surface 115" and the "side surface 116" in the first embodiment correspond to the "first side surface" and the "second side surface" in this disclosure, respectively. Each of the "cutouts 201 to 205" in the first embodiment corresponds to the "first cutout" in the present disclosure. Each of the "connection conductors 171 to 175" in the first embodiment corresponds to the "second connection conductor" in the present disclosure.

First Modification

Figure 6:
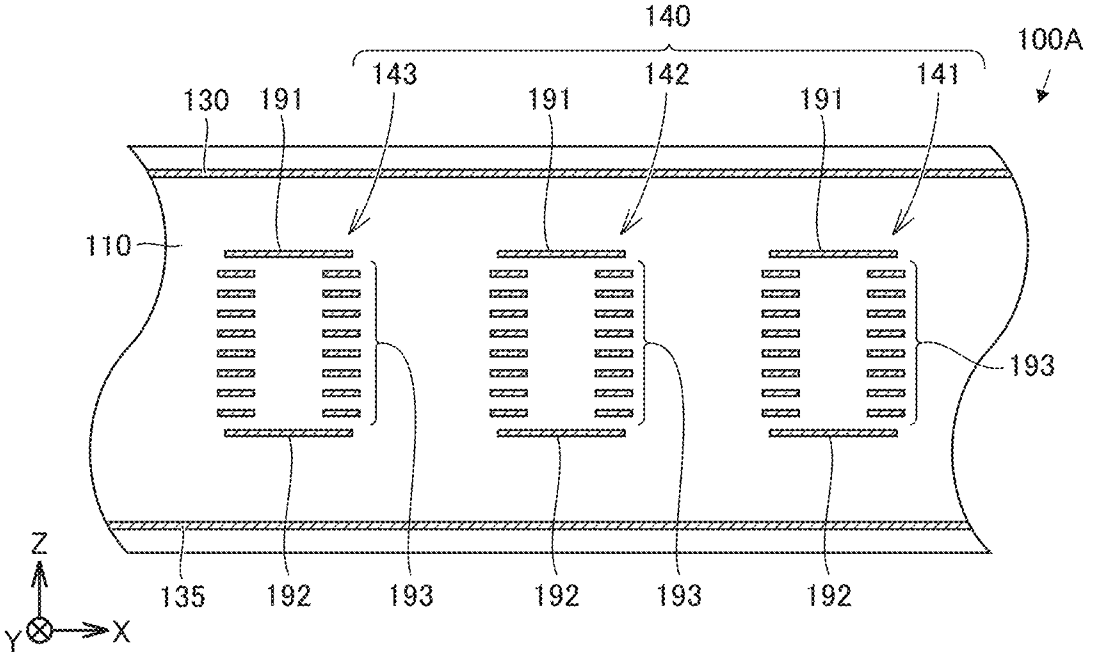
FIG. 6 is a cross-sectional view of a filter device according to a first modification.

In a first modification, a different configuration of a cutout formed in the resonator will be described. FIG. 6 is a cross-sectional view of a cutout formed in the resonator of a filter device 100A according to the first modification. In the filter device 100A, among the plurality of conductors constituting each resonator, the uppermost conductor 191 closest to the plate electrode 130 and the lowermost conductor 192 closest to the plate electrode 135 are not formed with a cutout. In other words, a cutout is formed in each of the conductors 193 excluding the uppermost conductor and the lowermost conductor. Since the other components of the filter device 100A are the same as those of the filter device 100 according to the first embodiment, the description thereof will not be repeated.

As mentioned above, the radio-frequency current tends to flow through the surface of the conductor due to the edge effect. Therefore, when viewed from the cross section of the resonator, the radio-frequency current tends to flow through the edges of the resonator in the X-axis direction and the edges of the resonator in the Z-axis direction (i.e., the uppermost conductor and the lowermost conductor). Therefore, by employing such a configuration in which no cutout is formed at the uppermost conductor and the lowermost conductor in the resonator, it is possible to reduce the conduction resistance, which makes it possible to reduce the loss due to the current flow. As a result, it is possible to further prevent the degradation in the performance of the dielectric filter.

The "conductor 191", the "conductor 192" and the "conductor 193" in the first modification correspond to the "first conductor", the "second conductor" and the "third conductor" in the present disclosure, respectively.

Second Modification

In a second modification, another different configuration of a cutout formed in the resonator will be described. FIG. 7 is a cross-sectional view of a cutout formed in the resonator of a filter device 100A1 according to the second modification. In the filter device 100A1, a plurality of conductors constituting each resonator includes two kinds of conductors, and the two kinds of conductors are alternately stacked in the stacking direction.

More specifically, as illustrated in FIG. 8A, similarly to the first embodiment, a first-shaped conductor 194 is formed with a cutout at a central portion in the X-axis direction, and as illustrated in FIG. 8B, a second-shaped conductor 195 is formed with a cutout at both edge portions in the X-axis direction, and the first-shaped conductor 194 and the second-shaped conductor 195 are alternately stacked. The first-shaped conductor 194 is formed with a cutout having a width of about ⅓ of the conductor at the central portion in the X-axis direction. On the other hand, the central portion of the second-shaped conductor 195 having a width of about ⅓ of the conductor in the X-axis direction is left untouched.

By alternately stacking the conductors 194 and 195 having two different shapes, the conductor density in the stacking direction is equalized at the edges of the resonator 140 connected to the shield conductor 121, which makes it possible to prevent the structural defects in the manufacturing process.

Third Modification

In a third modification, still another different configuration of a cutout formed in the resonator will be described. FIG. 9 is a cross-sectional view of a cutout formed in a resonator of a filter device 100A2 according to the third modification. In the filter device 100A2, a plurality of conductors constituting each resonator includes three kinds of conductors, and the three kinds of conductors are sequentially stacked in the stacking direction.

More specifically, the plurality of conductors include a third-shaped conductor 196 illustrated in FIG. 10A, a fourth-shaped conductor 197 illustrated in FIG. 10B, and a fifth-shaped conductor 198 illustrated in FIG. 10C.

Similar to the second-shaped conductor 195 according to the second modification, the third-shaped conductor 196 is formed with a cutout at both edge portions in the X-axis direction, and the central portion of the third-shaped conductor 196 having a width of about ⅓ of the conductor in the X-axis direction is left untouched. The fourth-shaped conductor 197 is formed with a cutout extending from the edge in the negative direction of the X-axis to the central portion, and an edge portion of the fourth-shaped conductor 197 having a width of about ⅓ of the conductor in the positive direction of the X-axis is left untouched. The fifth-shaped conductor 198 is formed with a cutout extending from the edge in the positive direction of the X-axis to the central portion, and an edge portion of the fifth-shaped conductor 198 having a width of about ⅓ of the conductor in the negative direction of the X-axis is left untouched.

By sequentially stacking the three kinds of conductors 196, 197, and 198 in the stacking direction, the conductor density in the stacking direction is equalized at the edges of the resonator 140 connected to the shield conductor 121, which makes it possible to prevent the structural defects in the manufacturing process.

Fourth Modification

In a fourth modification, a configuration in which a cutout is also formed in the capacitor electrode 160 that faces the resonator 140 will be described.

FIG. 11 is a plan view of a filter device 100B according to the fourth modification as viewed from the stacking direction (Z-axis direction). In the filter device 100B, each of the capacitor electrodes 161 to 165 is constituted by a plurality of conductors, and is connected to the shield conductor 122 at a connection portion, and the connection portion between each capacitor electrode and the shield conductor 122 is formed with a corresponding cutout among cutouts 211 to 215. Since the other components of the filter device 100B are the same as those of the filter device 100 according to the first embodiment, the description thereof will not be repeated.

By forming a cutout in the capacitor electrode 160, it is possible to reduce the conductor density in the connection portion between the capacitor electrode 160 and the shield conductor 122, which makes it possible to prevent the structural defects in the manufacturing process.

Such a dielectric filter is generally manufactured by batch molding a plurality of resonators in a planar direction and then dividing the plurality of resonators. By making the shape of the connection portion between the resonator 140 and the shield conductor 121 identical to the shape of the connection portion between the capacitor electrode 160 and the shield conductor 122, it is possible to prevent the shape of the connection portion from changing due to the accuracy of the division, which makes it possible to suppress variations in the performance of the dielectric filter and improve the productivity.

Each of the "cutouts 211 to 215" in the fourth modification corresponds to the "second cutout" in the present disclosure.

Second Embodiment

In a second embodiment, a configuration in which a connection conductor connected to a plate electrode is provided at the ground end (first end) of each resonator will be described.

FIG. 12 is a transparent perspective view illustrating the internal configuration of a filter device 100C according to the second embodiment. FIG. 13 is a plan view of the filter device 100C as viewed from the stacking direction.

With reference to FIGS. 12 and 13, in the filter device 100C, the resonators 141 to 145 are connected to the plate electrodes 130 and 135 via the connection conductors 151 to 155, respectively, each of which is provided at a position close to the first end that is connected to the shield conductor 121. Each of the connection conductors 151 to 155 extends from the plate electrode 130 to the plate electrode 135 through the plurality of conductors of the corresponding resonator. Each of the connection conductors 151 to 155 is electrically connected to the plurality of conductors constituting the corresponding resonator.

In such a configuration, most of the current flowing through each resonator flows through each of the connection conductors 151 to 155 to the ground terminal (i.e., the plate electrodes 130 and 135 and the shield conductor 121). Therefore, the effective length of each resonator is the length from the second end to the corresponding connection conductor. In the filter device 100C, the length from the second end of each resonator to the connection conductor (151 to 155) is designed to be $\lambda/4$.

In the filter device 100C, each of the cutouts 201 to 205 formed at the first end of each resonator is formed between the first end and each of the connection conductors 151 to 155. As described above, since most of the current flowing through each resonator flows through the connection conductors 151 to 155, even if the cutouts 201 to 205 are formed between the shield conductor 121 and the connection conductors 151 to 155, the influence on the performance of the dielectric filter is small. Therefore, the size of the cutouts 201 to 205 can be made larger than that of the filter device 100 according to the first embodiment, and the conductor density can be further reduced. Therefore, the formation of structural defects can be further reduced.

Each of the "connection conductors 151 to 155" in the second embodiment corresponds to the "first connection conductor" in the present disclosure.

It should be understood that the embodiments disclosed herein are illustrative and non-restrictive in all respects. The scope of the present disclosure is defined by the terms of the claims rather than the description of the embodiments above, and is intended to include any modifications within the scope and meaning equivalent to the terms of the claims.

10: communication apparatus; 12: antenna; 20: radio-frequency front-end circuit; 22, 28: band-pass filter; 24: amplifier; 26: attenuator; 30: mixer; 32: local oscillator; 40: D/A converter; 50: RF circuit; 100, 100A-100C, 100A1, 100A2: filter device; 110: stack body; 111: upper surface; 112: lower surface; 113-116: side surface; 121, 122: shield conductor; 130, 135, PL1, PL2: plate electrode; 140-145: resonator; 151-155, 170-175: connection conductor; 160-165, C10-C50: capacitor electrode; 191-198: conductor; 200-205, 211-215: cutout; T1: input terminal; T2: output terminal; V10, V11: via

The invention claimed is:

1. A dielectric filter comprising:

a stack body including a plurality of dielectric layers and having a cuboid shape;

a first plate electrode and a second plate electrode disposed inside the stack body apart from each other in a stacking direction;

a plurality of resonators disposed between the first plate electrode and the second plate electrode and configured to extend in a first direction orthogonal to the stacking direction; and a first shield conductor and a second shield conductor disposed on a first side surface and a second side surface of the stack body, respectively, and connected to the first plate electrode and the second plate electrode, both the first side surface and the second side surface being perpendicular to the first direction, the plurality of resonators being disposed inside the stack body side by side in a second direction orthogonal to both the stacking direction and the first direction, a first end of each of the plurality of resonators being connected to the first shield conductor, and a second end of each of the plurality of resonators being separated from the second shield conductor, the first end of each of the plurality of resonators being provided with a first cutout, and the first cutout being filled with dielectric material.

2. The dielectric filter according to claim 1, further comprising:

a first connection conductor disposed on the first end of each of the plurality of resonators and configured to connect a corresponding resonator to the first plate electrode and the second plate electrode.

3. The dielectric filter according to claim 2, wherein the first cutout is provided between the first shield conductor and the first connection conductor.

4. The dielectric filter according to claim 3, wherein each of the plurality of resonators comprises a plurality of conductors extending in the first direction and stacked in the stacking direction.

5. The dielectric filter according to claim 3, further comprising:

a capacitor electrode opposed to the second end of each of the plurality of resonators and connected to the second shield conductor.

6. The dielectric filter according to claim 2, wherein each of the plurality of resonators comprises a plurality of conductors extending in the first direction and stacked in the stacking direction.

7. The dielectric filter according to claim 2, further comprising:

a capacitor electrode opposed to the second end of each of the plurality of resonators and connected to the second shield conductor.

8. The dielectric filter according to claim 1, wherein each of the plurality of resonators comprises a plurality of conductors extending in the first direction and stacked in the stacking direction.

9. The dielectric filter according to claim 8, wherein the plurality of conductors includes:

a first conductor disposed in a first dielectric layer of the plurality of dielectric layers closest to the first plate electrode;

a second conductor disposed in a second dielectric layer of the plurality of dielectric layers closest to the second plate electrode; and at least one third conductor disposed in a third dielectric layer of the plurality of dielectric layers between the first conductor and the second conductor, and the first cutout is provided at a first end of the third conductor.

10. The dielectric filter according to claim 9, wherein when viewed in a plan view from the stacking direction, the first cutout is provided near a center of the third conductor in a width direction.

11. The dielectric filter according to claim 9, further comprising:

a second connection conductor disposed on the second end of each of the plurality of resonators and configured to electrically connect the plurality of conductors to each other.

12. The dielectric filter according to claim 9, further comprising:

a capacitor electrode opposed to the second end of each of the plurality of resonators and connected to the second shield conductor.

13. The dielectric filter according to claim 8, further comprising:

a second connection conductor disposed on the second end of each of the plurality of resonators and configured to electrically connect the plurality of conductors to each other.

14. The dielectric filter according to claim 13, further comprising:

a capacitor electrode opposed to the second end of each of the plurality of resonators and connected to the second shield conductor.

15. The dielectric filter according to claim 8, wherein when viewed in a plan view from the stacking direction, the first cutout is provided near a center of each of the plurality of conductors in a width direction.

16. The dielectric filter according to claim 8, further comprising:

a capacitor electrode opposed to the second end of each of the plurality of resonators and connected to the second shield conductor.

17. The dielectric filter according to claim 1, further comprising:

a capacitor electrode opposed to the second end of each of the plurality of resonators and connected to the second shield conductor.

18. The dielectric filter according to claim 17, wherein a second cutout is provided at a connection portion between the capacitor electrode and the second shield conductor.

* * * * *